(12) United States Patent
Alkarboly et al.

(10) Patent No.: US 12,526,164 B2
(45) Date of Patent: Jan. 13, 2026

(54) EDGE BLOCKCHAIN AUTHENTICATION

(71) Applicant: DISH Wireless L.L.C., Littleton, CO (US)

(72) Inventors: Ahmed Alkarboly, Denver, CO (US); Jennings Orcutt, Denver, CO (US); Vinayak Sharma, Denver, CO (US); Media Johnsen, Denver, CO (US)

(73) Assignee: DISH Wireless L.L.C., Littleton, CO (US)

( * ) Notice: Subject to any disclaimer, the term of this patent is extended or adjusted under 35 U.S.C. 154(b) by 375 days.

(21) Appl. No.: 18/154,180

(22) Filed: Jan. 13, 2023

(65) Prior Publication Data

US 2024/0243931 A1 Jul. 18, 2024

(51) Int. Cl.
*H04L 9/00* (2022.01)
*G06F 9/54* (2006.01)

(52) U.S. Cl.
CPC . *H04L 9/50* (2022.05); *G06F 9/54* (2013.01)

(58) Field of Classification Search
CPC ............ H04L 9/50; H04L 9/3239; G06F 9/54
See application file for complete search history.

(56) References Cited

U.S. PATENT DOCUMENTS

| | | | | |
|---|---|---|---|---|
| 10,833,843 | B1* | 11/2020 | Vijayvergia | H04L 9/3242 |
| 2012/0278873 | A1* | 11/2012 | Calero | H04L 63/0884 |
| | | | | 709/217 |
| 2016/0080932 | A1* | 3/2016 | Jin | H04W 8/183 |
| | | | | 455/418 |
| 2019/0333059 | A1* | 10/2019 | Fallah | G06F 16/1834 |
| 2019/0380031 | A1* | 12/2019 | Suthar | H04L 63/10 |
| 2020/0020038 | A1* | 1/2020 | Haile | H04L 63/0861 |
| 2020/0067907 | A1* | 2/2020 | Avetisov | H04L 67/133 |
| 2020/0106610 | A1* | 4/2020 | Doddavula | H04L 9/0637 |
| 2020/0119905 | A1* | 4/2020 | Revankar | G06Q 20/06 |
| 2021/0297265 | A1* | 9/2021 | Huang | G06F 16/2379 |

OTHER PUBLICATIONS

Alexander Koberl, "A Novel Approach for Providing Client-Veriable and Efficient Access to Private Smart Contracts," 2022, pp. 1-8 (Year: 2022).*
Matevz Pustisek, "Secure Modular Smart Contract Platform for Multi-Tenant 5G Applications," 2020. pp. 1-21. (Year: 2020).*

* cited by examiner

*Primary Examiner* — Luu T Pham
*Assistant Examiner* — Canh Le
(74) *Attorney, Agent, or Firm* — Kilpatrick Townsend & Stockton LLP

(57) ABSTRACT

Edge blockchain authentication for communications networks is disclosed. By using a blockchain approach instead of a conventional network function (NF) authentication approach, authentication for applications and services can be performed at an authenticating data center (ADC) without the need to involve the regional data center (RDC) and/or the national data center (NDC). Application Programming Interfaces (APIs) for individual NFs may not be needed. Once authenticated via the blockchain, legitimate transactions can interact with NFs.

16 Claims, 6 Drawing Sheets

EDGE BLOCKCHAIN AUTHENTICATION

FIELD

The present invention generally relates to authentication, and more specifically, to edge blockchain authentication for communications networks.

BACKGROUND

Currently, when a device seeks to perform network function (NF) authentication, regional and national data centers are involved. For instance, in telecommunications network 100 of FIG. 1, user equipment (UE) 110 sends an NF authentication request to a radio access network (RAN) 120, which, in turn, passes the request along to a breakout edge data center (BEDC) 130. BEDCs are typically smaller data centers that are proximate to the populations they serve. BEDCs may break out User Plane Function (UPF) data traffic (UPF-d) 132 and provide cloud computing resources and cached content to UE 110, such as providing NF application services for gaming, enterprise applications, etc.

However, BEDCs such as BEDC 130 still rely on other data centers for NF authentication services. As shown in FIG. 1, a regional data center (RDC) 140 receives the NF authentication request from BEDC 130. RDC 140 may provide core network functions, such as UPF for voice traffic (UPF-v) 142 and Short Message Service Function (SMSF) 144. This helps with managing user traffic latency, for instance. However, RDC 140 also does not perform NF authentication.

From RDC 140, the NF authentication request is sent to a national data center (NDC) 150, which may be located far away from UE 110, RAN 120, BEDC 130, and RDC 140. NDC 150 provides a Unified Data Repository (UDR) 152, and user verification 154 is finally performed here. UPF-d 132, UPF-v 142, SMSF 144, UDR 152, and user verification 154 are performed by dockerized computing clusters. It should be noted that UDR 152 may provide user verification functionality and include NDC authorized hardware DB 160. APIs specific to the NF are used as part of the user verification process. Once the user is verified 154 and authorized hardware is confirmed via NDC authorized hardware DB 160, NF authentication is completed by UE 110 and the NF is authorized. UE 110 is then able to access and use the respective application or service via BEDC 130.

Per the above, conventional telecommunications network 100 requires regional and national systems of data centers and respective hardware to perform NF authentication. Also, the various devices in the chain of the NF authentication process provide multiple potential points for cyberattacks, such as distributed denial of service (DDOS) attacks. Furthermore, the use of these potentially geographically distant devices increases overhead and latency. Accordingly, an improved and/or alternative approach may be beneficial.

SUMMARY

Certain embodiments of the present invention may provide solutions to the problems and needs in the art that have not yet been fully identified, appreciated, or solved by current authentication technologies, and/or provide a useful alternative thereto. For example, some embodiments of the present invention pertain to edge blockchain authentication for communications networks.

In an embodiment, a computing system includes memory storing computer program instructions and at least one processor configured to execute the computer program instructions. The computer program instructions are configured to cause the at least one processor to receive an authentication request from an application executing on user equipment (UE) that is seeking to use a network function (NF) and initiate a blockchain interaction using an application programming interface (API) to authenticate the authentication request for the NF via a blockchain network. The blockchain network is configured to validate the blockchain transaction using a smart contract and a ledger. The computer program instructions are also configured to cause the at least one processor to confirm that the interaction was verified. The computer program instructions are further configured to cause the at least one processor to execute the NF or cause execution of the NF after the confirmation and provide information pertaining to the execution of the NF to the UE.

In another embodiment, an authenticating data center (ADC) includes a plurality of computing systems. One or more of the plurality of computing systems are configured to individually or collectively receive an authentication request from an application executing on UE that is seeking to use an NF and initiate a blockchain interaction using an API to authenticate the authentication request for the NF via a blockchain network. The blockchain network is configured to validate the blockchain interaction using a smart contract and a ledger. One or more of the plurality of computing systems are also configured to individually or collectively confirm that the blockchain interaction was verified and execute the NF or cause execution of the NF after the confirmation.

In yet another embodiment, a computer-implemented method includes initiating a blockchain interaction using an API to authenticate an authentication request for an NF from UE via a blockchain network, by one or more computing systems of an ADC. The blockchain network is configured to validate the blockchain interaction using a smart contract and a ledger. The computer-implemented method also includes confirming that the blockchain interaction was verified, by the one or more computing systems of the ADC. The computer-implemented method further includes executing the NF or causing execution of the NF after the confirmation, by the one or more computing systems of the ADC.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
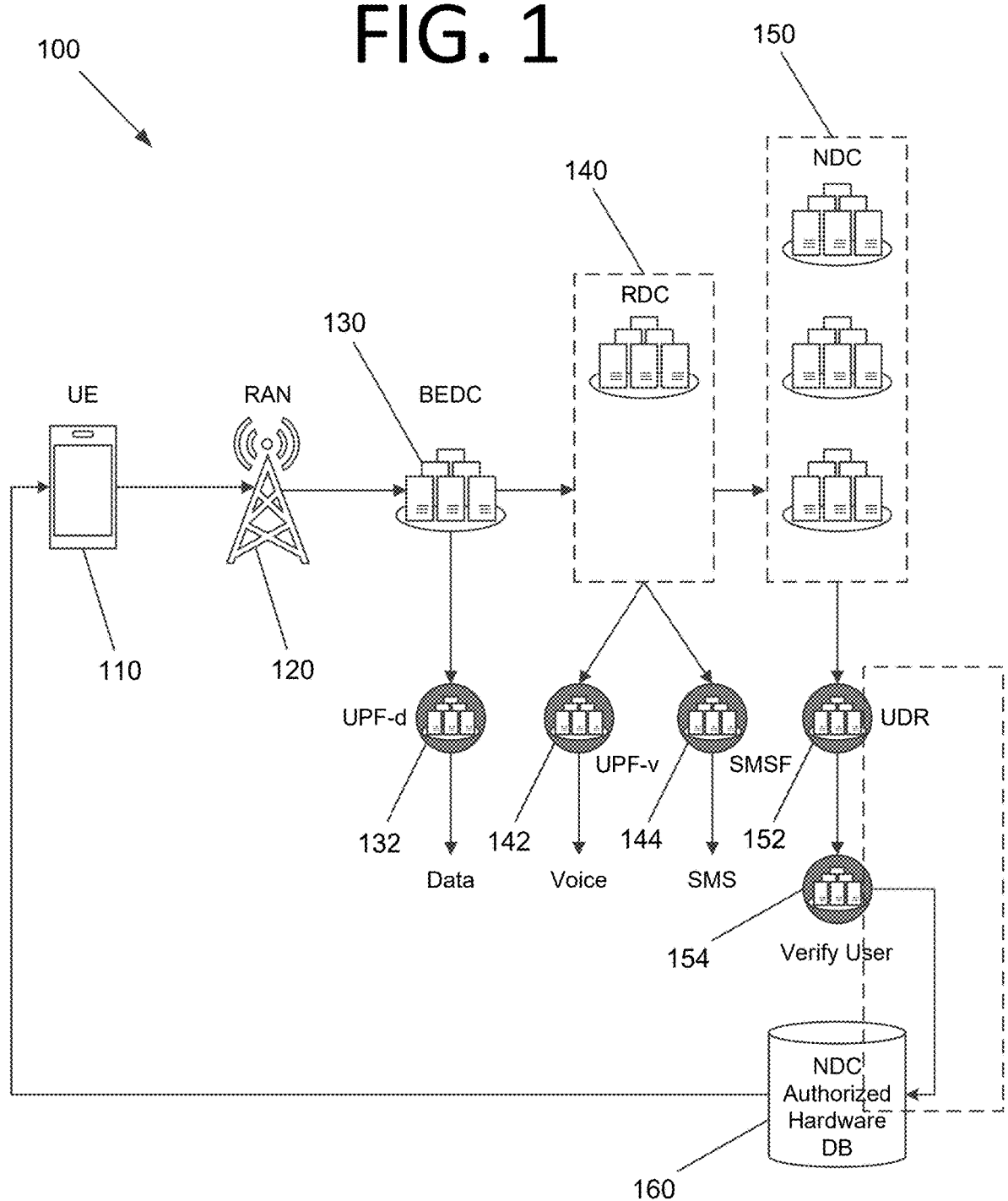
FIG. 1 is an architectural diagram illustrating a conventional telecommunications network.

Some embodiments pertain to edge blockchain authentication for communications networks. By using a blockchain approach instead of the conventional NF authentication approach of FIG. 1, authentication for applications and services can be performed at an authenticating data center (ADC) without the need to involve the RDC and/or the NDC. Application Programming Interfaces (APIs) for individual NFs may not be needed in some embodiments. Once authenticated via the blockchain, legitimate transactions can interact with NFs. A user/device may be able to access certain NFs based on a smart contract for that user/device. NF access may be provided as part of an agreement or subscription enforced via the smart contract with that user/device, the carrier may charge for NFs on a per-use basis, etc. The smart contracts contain tokens.

Blockchain authentication APIs return token information from the ledger. These blockchain authentication APIs may be used to check whether specific token(s) that contain device identification information have been registered on the ledger. If the device has been registered (i.e., a token has been minted containing identifying information of the device), that device is authenticated to access the NF.

Authentication may be performed more quickly since various ADCs across the country could authenticate UE and the ADCs are typically closer to the UE. Unlike a database replicated and distributed across the country, the blockchain-based approach of some embodiments need not maintain version control like a replicated centralized system. Authorized users/devices and $3^{rd}$ parties could also authenticate users (i.e., devices, hardware, software, etc.) on the blockchain in some embodiments. Furthermore, reducing the number of point solutions to access different network functions centralizes security policy and enforcement across the distributed environment.

Some embodiments provide a programmable network where users/devices can develop on top of the network, giving developers a high degree of flexibility in developing applications. Previously, users/devices would utilize APIs provided by the carrier for each NF, which limits what applications and services can do in the network. By using APIs for authentication that communicate with the blockchain ledger rather than on an individual NF basis, developers can create a broad range of applications within constraints agreed upon between the carrier and the user/device via a blockchain smart contract. Applications and services can be developed that do many different things and can potentially be deployed as microservices. As used herein, "microservices" refer to different, distinct components that write to and read from the blockchain. Different use cases can be considered to be a service, and services can be broken down into microservices.

Figure 2:
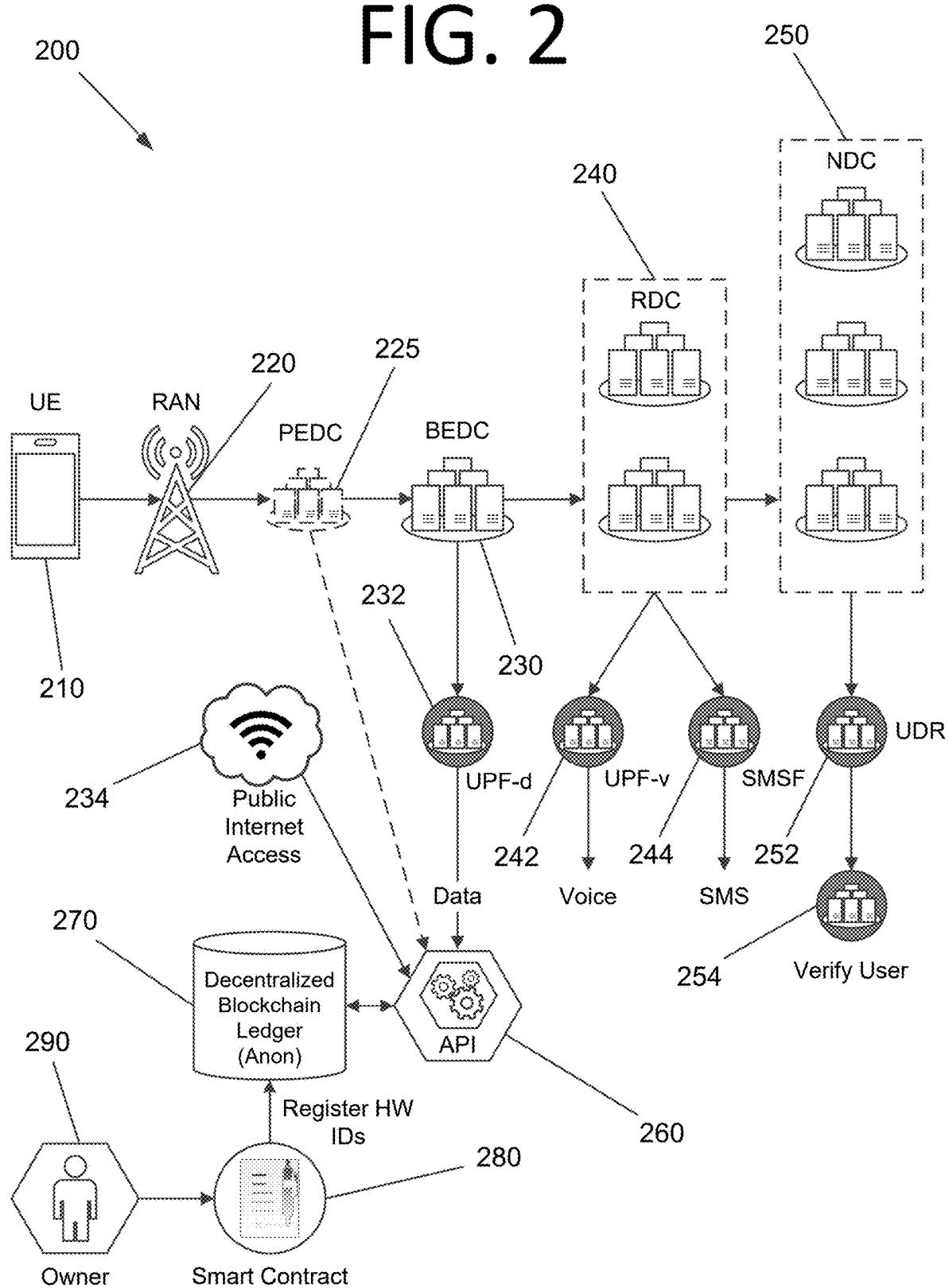
FIG. 2 is an architectural diagram illustrating a telecommunications network configured to perform edge blockchain authentication, according to an embodiment of the present invention.

FIG. 2 is an architectural diagram illustrating a telecommunications network 200 configured to perform edge blockchain authentication, according to an embodiment of the present invention. Like telecommunications network 100, telecommunications network 200 includes/provides UE 210, RAN 220, BEDC 230, UPF-d 232, RDC 240, UPF-v 242, SMSF 244, NDC 250, UDR 252, and user verification 254 (for voice and SMS). Telecommunications network 200 may also include a pass-through edge data center (PEDC) 225. In order to authenticate UE 110 for applications and/or services, Internet access 234 is provisioned via UPF-d. Authentication API(s) 260 can receive hardware information with respect to UE 210 in the form of token information from PEDC 225, BEDC 230, and/or any other suitable data center with public Internet connectivity without deviating from the scope of the invention. As used herein, such a data center is be referred to as an authenticating data center (ADC). Authentication API(s) 260 can pass this token on to anonymous decentralized blockchain ledger 270 that utilizes a smart contract 280 for a user/device associated with the transaction for the application to perform verification. If verification is successful, a token may be sent back that contains the verification status. Owner 290 can provision information via a marketplace to smart contracts, such as smart contract 280.

Resiliency is enhanced due to the decentralization of the blockchain. This differs from UDR 152, for example, where NDC authorized hardware DB 160 is provided in a single location at a national level. For instance, if a natural disaster knocked out some nodes, decentralized blockchain ledger 270 could still be accessed via other nodes. Per the above, blockchain authentication is used to verify NF access for applications and/or services requested by UE 210. A description of an example blockchain implementation is provided below.

A decentralized blockchain ledger (i.e., a distributed ledger) records transactions. The ledger is replicated in whole or in part on multiple computing systems, and serves as a cryptographic distributed ledger (CDL) that has reversibility (recorded transactions cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified), or any combination thereof. A CDL is a continuously growing list of records that typically apply cryptographic techniques, such as storing cryptographic hashes relating to other blocks. In this embodiment, the blockchain may store hardware information for the UE, service tier information, information pertaining to the owner, and metadata.

A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes the need for a central intermediary. Each block contains a timestamp and a link to a previous block. A blockchain can be used to hold, track, transfer, and verify information. Since a blockchain is a distributed system, before adding a transaction to the blockchain ledger, blockchain network peers need to reach a consensus. The computing systems that are used as peers varies based on the specific blockchain system that is used. In certain embodiments, the carrier may designate some or all of the peers (e.g., designated computing systems in the carrier's network).

Typically, blockchain platforms leverage immutable logs by providing support to handle custom business logic in the form of algorithmic units (e.g., smart contracts). A smart contract encapsulates both logic and state. The state may consist of a key/value model. Transactions are completed based on the result of execution of smart contracts, which determine the new state of the smart contract by including the modifications to apply to current state. The state can be reconstructed by replaying the transactions registered into the immutable log. Transactions are grouped into blocks and no order is determined to the changes made by the transactions included in each block.

A blockchain is a distributed system including multiple nodes that communicate with one another. A blockchain operates programs called "chaincode" (e.g., smart contracts, etc.), holds state and ledger data, and executes transactions. Some transactions are operations invoked on the chaincode. In general, blockchain transactions typically must be "endorsed" by certain blockchain members commonly referred to as endorsers. Endorsers may be provided by a blockchain service provider or be provided by the carrier, for example. Only endorsed transactions may be committed to the blockchain and have an effect on the state of the blockchain. Other transactions that are not endorsed are disregarded. One or more special chaincodes may exist for management functions and parameters, collectively called "system chaincodes."

Nodes are the communication entities of the blockchain system. A "node" may perform a logical function in the sense that multiple nodes of different types can run on the same physical server. Nodes may be grouped in trust domains and associated with logical entities that control the nodes in various ways. Nodes may include different types, such as a client or submitting client node, which submits a transaction invocation to an endorser and broadcasts transaction-proposals to an ordering service (e.g., an ordering node). Another type of node is a peer node (peers), which can receive client submitted transactions, commit the transactions, and maintain a state and a copy of the ledger of blockchain transactions. Peers can also have the role of an endorser, although this is not necessarily a requirement. An ordering service node, commonly referred to as an orderer, is a node running the communication service for all nodes. The orderer implements a delivery guarantee, such as a broadcast to each of the peer nodes in the system when committing transactions and modifying a world state of the blockchain. The "world state" is another name for the initial blockchain transaction, which normally includes control and setup information.

A ledger is a sequenced, tamper-resistant record of the state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain that is used to store an immutable, sequenced record in blocks. The ledger also includes a state database that maintains a current state of the blockchain. There is typically one ledger per channel. Each peer node maintains a copy of the ledger for each channel that the peer is a member of.

A blockchain is a transaction log structured as hash-linked blocks. Each block contains a sequence of N transactions, where N is at least one. The block header includes a hash of the transactions of the block, as well as a hash of the prior block header. In this way, all transactions on the ledger may be sequenced and cryptographically linked together. Accordingly, it is difficult or impossible to tamper with the ledger data without breaking the hash links. A hash of a most recently added blockchain block represents the transactions on the blockchain that have come before it, ensuring that the peer nodes are in a consistent and trusted state. The blockchain may be stored on a peer node file system (e.g., local memory, attached storage, cloud storage, etc.), efficiently supporting the append-only nature of the blockchain workload.

The current state of the immutable ledger represents the latest values for the keys that are included in the blockchain transaction log. Because the current state represents the latest key values known to a channel, it is sometimes referred to as the world state. Chaincode invocations execute transactions against the current state data of the ledger. To make these chaincode interactions efficient, the latest values of the keys may be stored in a state database. The state database may simply be an indexed view into the blockchain transaction log in some embodiments, and as such, can be regenerated from the blockchain. The state database may automatically be recovered (or generated, if needed) upon peer node startup and before transactions are accepted.

Some embodiments support and/or utilize a blockchain solution that sets a unique order of changes to a state of a smart contract. The setting of the unique order may include associating the same numeric value to each key modified by a valid transaction. The unique order enables comparison of changes when modifications are made on different blocks and when modifications are made within a same block. Taking advantage of the immutable order guaranteed by the platform, the key and value data model used to maintain the state of smart contracts is augmented by automatically setting a timestamp to the change based on the order in which the transaction that gave rise to such value was stored in the immutable log. This ordering is made available to the smart contract logic.

It should be noted that when a transaction is committed to the ledger and the state is updated based on the transaction results, a timestamp is calculated for updated keys based on the order in which the transaction was stored. The keys that are updated as part of the same transaction may receive the same timestamp. If, however, the smart contract involves more keys that were not modified in the current transaction, then a modification is not made to the unmodified keys.

The blockchain platform of some embodiments provides ordering to be used as part of the smart contract logic, and a smart contract may be permitted to use a relative order of changes. For example, the comparison may determine whether an asset was modified before or after another asset. The blockchain platform may be configured to provide the ordering so the smart contract may determine the tables including the modifications and compare the changes.

In some embodiments, the order in which transactions are set in the ledger is utilized to determine a unique order of changes to the assets. When an asset is modified as part of a transaction, the timestamp for that particular asset is calculated. This provides a uniform or global order relative to the changes incorporated into the ledger. By exposing the ordering, the smart contract can determine whether a particular asset was modified before or after another asset.

Figure 3:
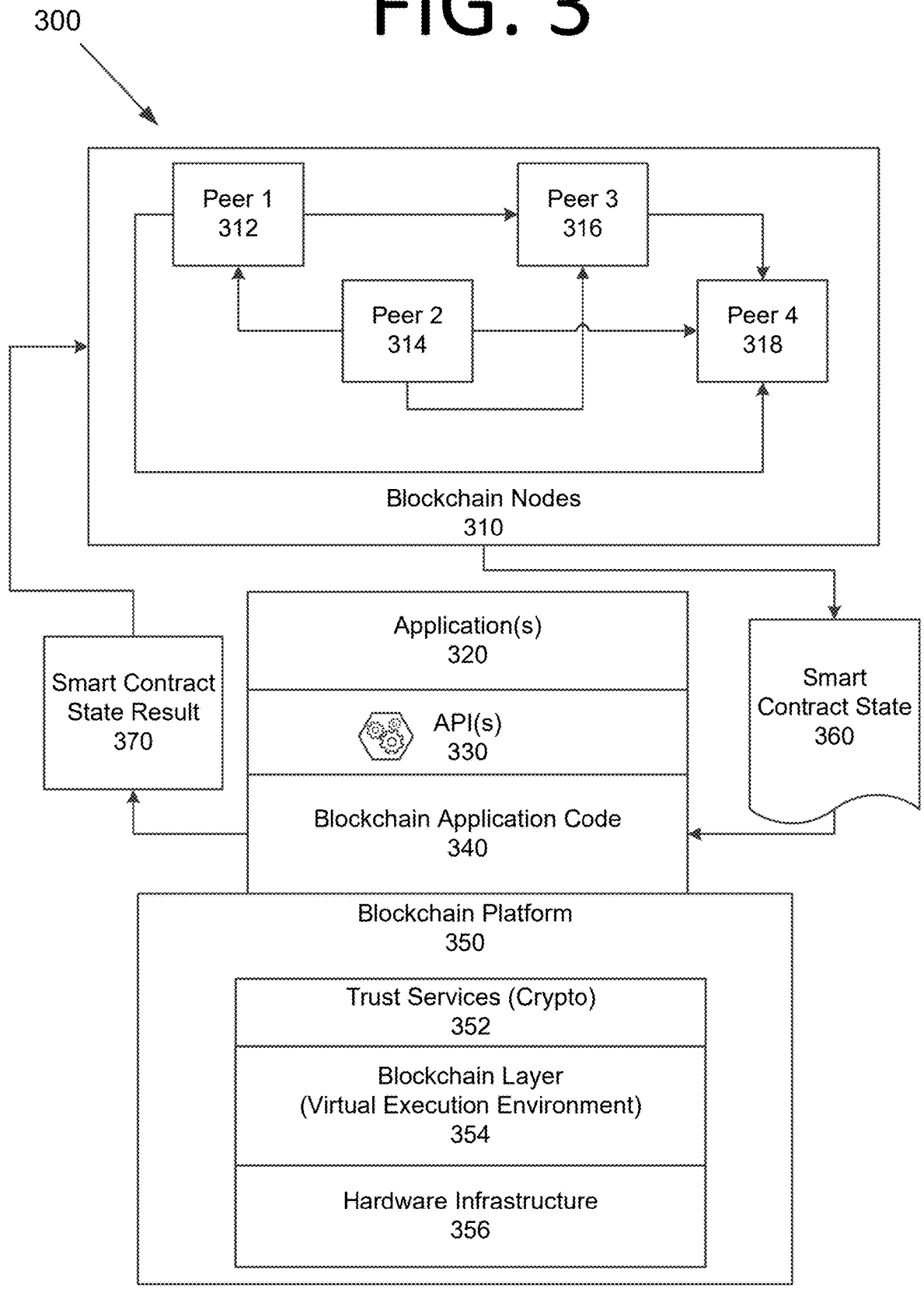
FIG. 3 is an architectural diagram illustrating a blockchain system, according to an embodiment of the present invention.

FIG. 3 is an architectural diagram illustrating a blockchain system 300, according to an embodiment of the present invention. Blockchain nodes 310 include peer nodes 312, 314, 316, 318. Peer nodes 312, 314, 316, 318 participate various activities, such as blockchain transaction addition and validation processes (consensus). One or more of peer nodes 312, 314, 316, 318 may endorse transactions (endorser) and/or provide an ordering service (orderer) for the blockchain nodes in blockchain system 300. A blockchain node may initiate a blockchain authentication and seek to write to a blockchain immutable ledger stored in blockchain layer 354, a copy of which may also be stored on the underpinning physical hardware infrastructure 356. The blockchain configuration may include one or applications 320, such as UE applications that have UPF-d data and authenticate via API(s) 330 that access and execute stored blockchain application code 340 (e.g., chaincode, smart contracts, etc.). In some embodiments, API(s) 330 pass tokens including UE hardware information blockchain application code 340, which then performs verification via blockchain platform 350. In some embodiments, blockchain application code 340 is developed by a carrier and can maintain a state, control assets, and receive external information. Blockchain application code 340 in some embodiments can be deployed as a transaction and appended to the distributed ledger on blockchain peer nodes 312, 314, 316, 318.

A blockchain platform 350 includes various layers of blockchain data, services (e.g., cryptographic trust services 352), and underpinning physical hardware infrastructure 356 that may be used to receive and store new transactions and provide access to auditors seeking to access data entries. Various blockchain platforms may be used without deviating from the scope of the invention, such as Avalanche™, Cardano™, Chainalysis KYT™, Ethereum™, Hyperledger Fabric™, Hyperledger Sawtooth™, IBM Blockchain™, Polkadot™, etc. Certain embodiments may be platform-agnostic, capable of being developed and deployed using any suitable blockchain platform. A blockchain layer 354 may expose an interface that provides access to the virtual execution environment to process program code and engage hardware infrastructure 356. Cryptographic trust services 352 may be used to verify transactions such as asset exchange transactions and to keep information private.

Blockchain application code 340 may control blockchain assets via blockchain platform 350. For example, blockchain application code 340 may store and transfer data and may be executed by peer nodes 312, 314, 316, 318 in the form of a smart contract and associated chaincode with conditions or other code elements subject to its execution. The smart contracts can be used to identify rules associated with authorization and access requirements and usage of the ledger. For example, a smart contract state 360 may be processed by one or more processing entities (e.g., virtual machines) included in blockchain layer 354. A smart contract state result 370 may include modifications to smart contract state 360. Hardware infrastructure 356 may be utilized to retrieve the data or information described herein.

A smart contract may be created within the chaincode via a high-level application and programming language, and then written to a block in the blockchain. The smart contract may include executable code that is registered, stored, and/or replicated with a blockchain (e.g., a distributed network of blockchain nodes). A transaction is an execution of the smart contract code which can be performed in response to conditions associated with the smart contract being satisfied. The executing of the smart contract may trigger trusted modification(s) to a state of a digital blockchain ledger. The modification(s) to the blockchain ledger caused by the smart contract execution may be automatically replicated throughout the distributed network of blockchain nodes through one or more consensus protocols.

The smart contract may write data to the blockchain in key-value pairs. The smart contract code can read the values stored in a blockchain and use these values in application operations. The smart contract code can write the output of various logic operations into the blockchain. The smart contract code may be used to create a temporary data structure in a virtual machine or other suitable environment. Data written to the blockchain can be public or can be encrypted and maintained as private. The temporary data that is used/generated by the smart contract is typically held in memory by the supplied execution environment and then deleted after the data for the blockchain is identified.

Chaincode may include the code interpretation of a smart contract and additional features. As described herein, the chaincode may be computer program code deployed on a computing network that is executed and validated by chain validators together during a consensus process. The chaincode receives a hash and retrieves a hash from the blockchain associated with a data template created by use of a previously stored feature extractor in some embodiments. If the hashes of the hash identifier and the hash created from the stored identifier template data match, then the chaincode sends an authorization key to the requested service. The chaincode may write data associated with cryptographic details to the blockchain. Smart contract state 360, including a wallet or document, may be modified. The result of the modification (smart contract state result 370) may be provided to one or more of peer nodes 312, 314, 316, 318.

Developers write application(s) 320 that utilize NFs and call API(s) 330 for authentication purposes. In some embodiments, developers may create custom APIs as part of API(s) 330. Not all network actions are enforced via blockchain. Application(s) 320 sit on top of carrier infrastructure (e.g., RAN and carrier NFs that provide access to the World Wide Web (WWW) where application(s) 320 would reside, interacting with network slices).

Use of API(s) for blockchain interactions differs from conventional telecommunications systems, where multiple APIs are usually provided for every NF. As such, hundreds or thousands of APIs may exist for utilizing NFs in conventional systems, as opposed to a much smaller number of APIs (perhaps even only one) in some embodiments that are used for authentication purposes. As such, the gating function in some embodiments is the smart contract rather than APIs.

Some embodiments facilitate the development and deployment of microservices that provide new uses of NFs, for example. Developers can also propose new NFs for their application needs that the carrier can implement if desired, and without requiring APIs specifically developed for that NF. New technologies can be connected, protected, and deployed across a distributed native cloud network. Some examples of NFs that may be provided in this manner include, but are not limited to, location data requests, policy requests, network slicing, smart routing, obtaining traffic pattern insights across the network, providing access to cloud native distributed infrastructure, session management, distributed computing, mobility management, etc. The tools to interact with the smart contracts may be modular and platform-agnostic. Such could be applications or tokens passed via UPF-d directly to the blockchain.

Discovery of existing NFs may be automated, allowing legitimate transactions to interact with these NFs. In certain embodiments, these interactions could be monetized by requiring the correct credentials or payment of a fee to interact with a given smart contract. Furthermore, monitoring for anomalies may be performed by monitoring a computing system that provides API(s) 330. For instance, if many requests are hitting one or more of API(s) 330, a DDOS attack may be inferred from this location rather than monitoring hundreds or thousands of individual APIs for NFs in conventional telecommunications networks.

Use of smart contracts agreed upon by the carrier and developers/vendors allows developers and vendors to authenticate and interact with the network in a consistent manner and enforces consistent policies across the entire network regardless of the hosting location. In some embodiments, developers define a network interface point and propose this to the carrier. If the carrier agrees, a smart contract is created for this NF. However, in some embodiments, smart contract creation may be automated within a framework of rules for developers provided by the vendor. Automatic smart contracts could be provisioned via a self-service portal hosted on a carrier marketplace in some embodiments.

Because new APIs are not required for new NFs, when developed, NFs can be deployed more rapidly in the existing infrastructure. A software development kit (SDK) may be made available to developers with instructions on how to interact with the authentication API(s). Cloud computing resources, location services, and other NFs would be accessed via SDK functionality.

Figure 4:
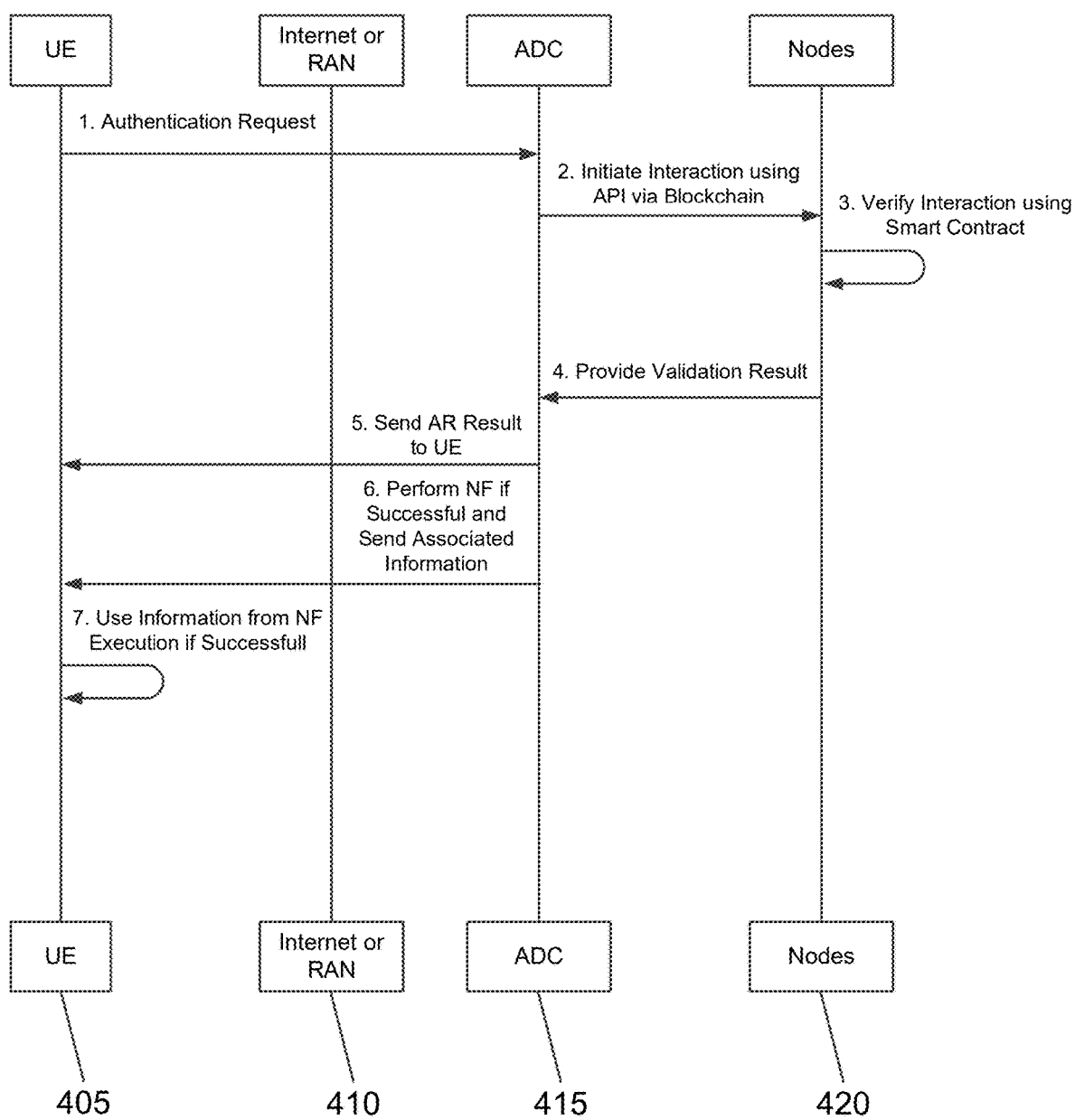
FIG. 4 is a flow diagram illustrating a process for performing edge blockchain authentication, according to an embodiment of the present invention.

FIG. 4 is a flow diagram illustrating a process 400 for performing edge blockchain authentication, according to an embodiment of the present invention. The process begins with UE 405 sending an authentication request to an ADC 415 via the Internet or a RAN 410. This authentication request may include hardware information pertaining to UE 405. ADC 415 then initiates a blockchain interaction using an API (e.g., a transaction that adds to the blockchain or a read-only operation where existing blockchain information is read, but blocks are not added) with channel nodes 420 in the blockchain network for the interaction. The API may provide token information for a token that already exists in the smart contract. The API can check for token(s) including the hardware information pertaining to UE 405 as part of initiating the blockchain interaction. Channel nodes 420 then attempt to verify the interaction using an associated smart contract for the channel. If the interaction is verified by nodes 420 (i.e., the specified token information is returned), this means that the validation that the user/device was registered on the ledger was successful, and the user should thus be allowed to access token-gated NFs.

ADC 415 updates its own blockchain ledger cop(ies) in the case of a transaction (if ADC 415 maintains such cop(ies)). For instance, a new token may be minted for a user that has recently acquired, changed, or updated a subscription, for a new user/device, etc. If the interaction was successful, ADC 415 sends a result of the authentication request to UE 405, performs the NF associated with the authentication request, and sends information associated with the NF request to UE 405 (e.g., in the form of a token). In some embodiments, the notification that the authentication request was successful and the information associated with execution of the NF may be sent to UE 405 in the same communication. The associated application on UE 405 then uses the NF information in its execution.

Figure 5:
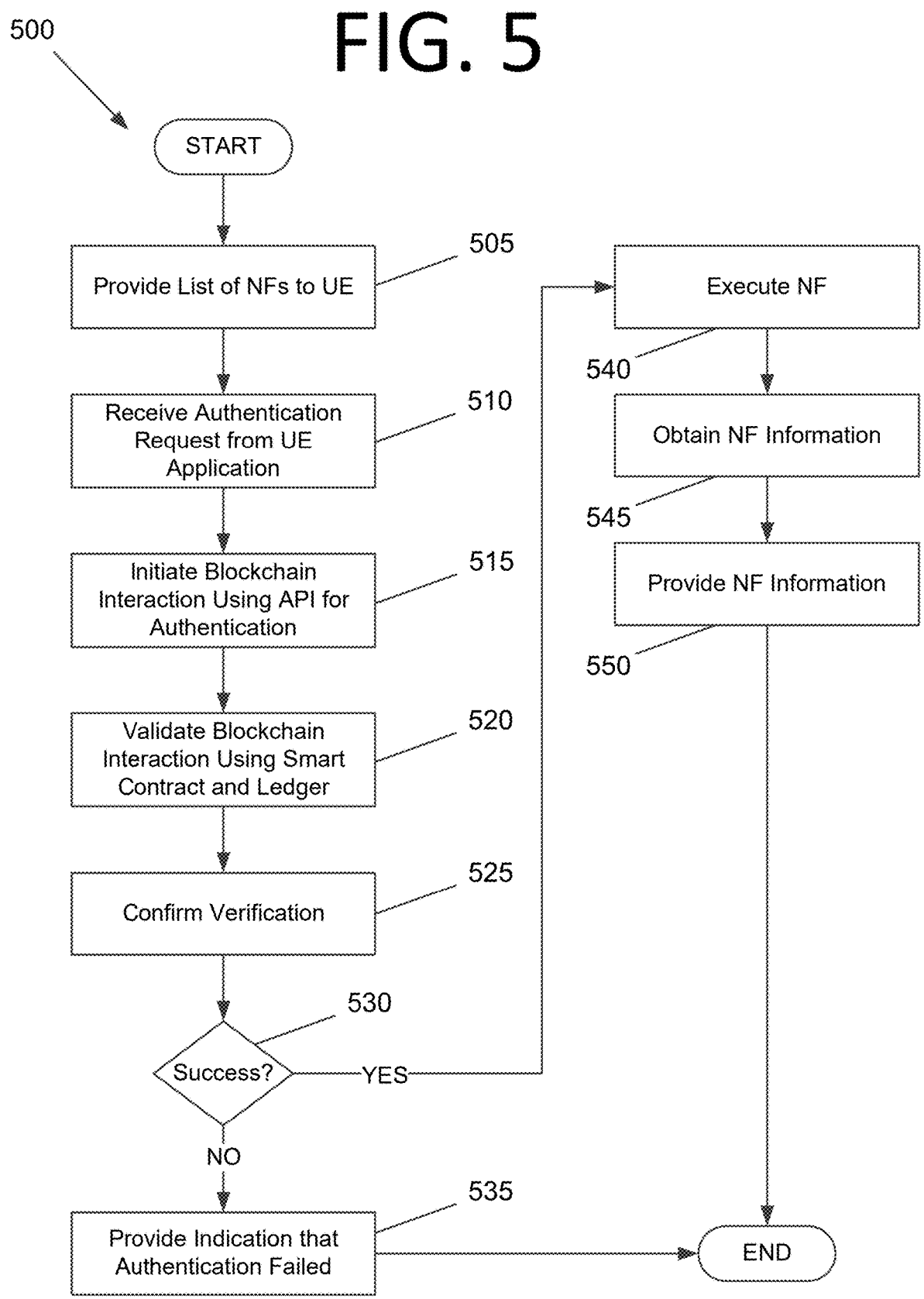
FIG. 5 is a flowchart illustrating a process for performing edge blockchain authentication, according to an embodiment of the present invention.

FIG. 5 is a flowchart illustrating a process 500 for performing edge blockchain authentication, according to an embodiment of the present invention. In some embodiments, the process is performed by an ADC or a computing system thereof. The process begins with providing a list of NFs to UE at 505. An authentication request is received from an application executing on the UE that is seeking to use an NF at 510. In some embodiments, the NF performs one or more of providing location data, providing a policy, performing network slicing, performing smart routing, obtaining traffic pattern insights across the network, providing access to cloud native distributed infrastructure, performing session management, providing distributed computing, and providing mobility management services.

A blockchain interaction is initiated using an API to authenticate the authentication request for the NF via a blockchain network at 515. In some embodiments, the API passes token information for a token that already exists in the smart contract. The API can check for token(s) including UE hardware information. The blockchain network attempts to validate the blockchain interaction using a smart contract and a ledger at 520 and verification that the blockchain interaction was authenticated is performed at 525.

In some embodiments, the blockchain interaction is a transaction, and the transaction is appended as a block to the ledger by the blockchain network. For instance, a new token may be minted for a user that has recently acquired, changed, or updated a subscription, for a new user/device, etc. The ADC or a computing system thereof may maintain and update a copy of the blockchain ledger accordingly. In certain embodiments, the blockchain interaction is a read-only information request where the validation involves checking for existing token(s) based on the token information provided by the API. In some embodiments, the smart contract controls which NFs the UE can access for the user/device. In certain embodiments, the API is configured to use the smart contract, which performs verification via a blockchain system. If the verification fails at 530, an indication that authentication failed is provided to the UE application at 535.

However, if the verification succeeds at 530, the NF is executed at 540. Information pertaining to the NF is obtained at 545. This information is then provided to the UE application that uses the NF at 550.

Figure 6:
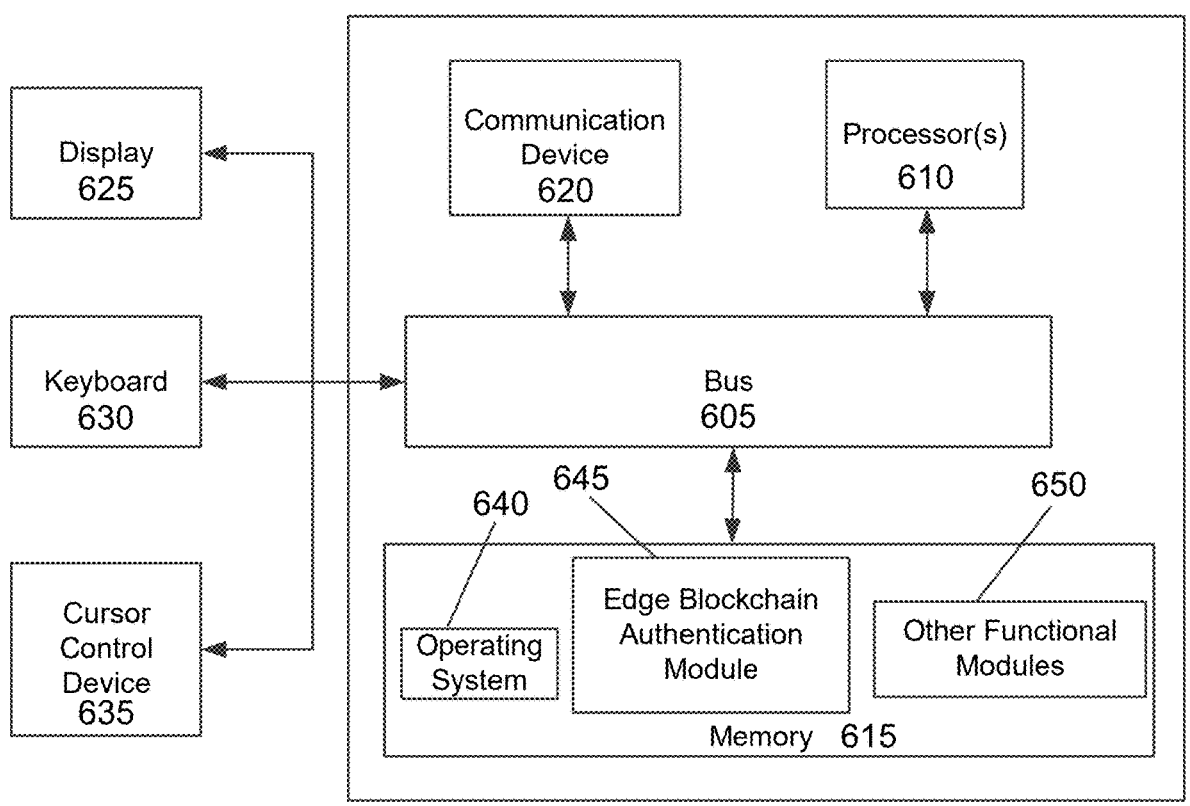
FIG. 6 is an architectural diagram illustrating a computing system configured to request, perform, or otherwise participate in edge blockchain authentication, according to an embodiment of the present invention.

FIG. 6 is an architectural diagram illustrating a computing system 600 configured to request, perform, or otherwise participate in edge blockchain authentication, according to an embodiment of the present invention. In some embodiments, computing system 600 may be one or more of the computing systems depicted and/or described herein, such as UE, a computing system of an ADC, etc. Computing system 600 includes a bus 605 or other communication mechanism for communicating information, and processor(s) 610 coupled to bus 605 for processing information. Processor(s) 610 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 610 may also have multiple processing cores, and at least some of the cores may be configured to perform specific functions. Multi-parallel processing may be used in some embodiments. In certain embodiments, at least one of processor(s) 610 may be a neuromorphic circuit that includes processing elements that mimic biological neurons. In some embodiments, neuromorphic circuits may not require the typical components of a Von Neumann computing architecture.

Computing system 600 further includes a memory 615 for storing information and instructions to be executed by processor(s) 610. Memory 615 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 610 and may include volatile media, non-volatile media, or both. The media may also be removable, non-removable, or both.

Additionally, computing system 600 includes a communication device 620, such as a transceiver, to provide access to a communications network via a wireless and/or wired connection. In some embodiments, communication device 6120 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 620 may include one or more antennas that are singular, arrayed, phased, switched, beamforming, beam-steering, a combination thereof, and or any other antenna configuration without deviating from the scope of the invention.

Processor(s) 610 are further coupled via bus 605 to a display 625, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 625 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 630 and a cursor control device 635, such as a computer mouse, a touchpad, etc., are further coupled to bus 605 to enable a user to interface with computing system 600. However, in certain embodiments, a physical keyboard and mouse may not be present, and the user may interact with the device solely through display 625 and/or a touchpad (not shown). Any type and combination of input devices may be used as a matter of design choice. In certain embodiments, no physical input device and/or display is present. For instance, the user may interact with computing system 60 remotely via another computing system in communication therewith, or computing system 600 may operate autonomously.

Memory 615 stores software modules that provide functionality when executed by processor(s) 610. The modules include an operating system 640 for computing system 600. The modules further include a DSDS module 645 that is configured to perform all or part of the processes described herein or derivatives thereof. Computing system 600 may include one or more additional functional modules 650 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 4 and 5 may be performed by computer program(s), encoding instructions for the processor(s) to perform at least part of the process(es) described in FIGS. 4 and 5, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 610 of computing system 600 of FIG. 6) to implement all or part of the process steps described in FIGS. 4 and 5, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computing system, comprising:
memory storing computer program instructions; and
at least one processor configured to execute the computer program instructions, wherein the computer program instructions are configured to cause the at least one processor to:
receive an authentication request from an application executing on user equipment (UE) that is seeking to use a network function (NF) of a cellular network,
initiate a blockchain interaction using an application programming interface (API) to authenticate the authentication request for the NF via a blockchain network, wherein the blockchain interaction is a transaction, and the transaction is appended as a block to the ledger by the blockchain network, the blockchain network configured to validate the blockchain interaction using an automated smart contract and a ledger, the smart contract created by a vendor associated with the cellular network and controlling the access of the NF by the UE,
confirm that the blockchain interaction was verified,
execute the NF or cause execution of the NF after the confirmation, wherein the NF performs one or more of providing location data, providing a policy, performing network slicing, performing smart routing, obtaining traffic pattern insights across the network, providing access to cloud native distributed infrastructure, performing session management, providing distributed computing, and providing mobility management services, and
provide information pertaining to the execution of the NF to the UE.

2. The computing system of claim 1, wherein the computing system is part of an authenticating data center (ADC).

3. The computing system of claim 1, wherein the blockchain interaction is a read-only information request.

4. The computing system of claim 1, wherein the API sends token information comprising hardware information pertaining to the UE.

5. The computing system of claim 1, wherein
the API is configured to use the smart contract, and
the smart contract performs verification via a blockchain system.

6. The computing system of claim 1, wherein the computer program instructions are further configured to cause the at least one processor to:
provide a list of NFs to the UE.

7. The computing system of claim 1, wherein the computer program instructions are further configured to cause the at least one processor to:
  update a copy of the blockchain ledger stored on or accessible by the computing system.

8. A non-transitory computer-readable medium comprising instructions that, when executed by one or more processors, cause the one or more processors to perform operations comprising:
  receiving an authentication request from an application executing on user equipment (UE) that is seeking to use a network function (NF) of a cellular network,
  initiating a blockchain interaction using an application programming interface (API) to authenticate the authentication request for the NF via a blockchain network, wherein the blockchain interaction is a transaction, and the transaction is appended as a block to the ledger by the blockchain network, the blockchain network configured to validate the blockchain interaction using an automated smart contract and a ledger, the smart contract created by a vendor associated with the cellular network and controlling the access of the NF by the UE,
  confirming that the blockchain interaction was verified, and
  executing the NF or cause execution of the NF after the confirmation, wherein the NF performs one or more of providing location data, providing a policy, performing network slicing, performing smart routing, obtaining traffic pattern insights across the network, providing access to cloud native distributed infrastructure, performing session management, providing distributed computing, and providing mobility management services; and
  provide information pertaining to the execution of the NF to the UE.

9. The non-transitory computer-readable medium of claim 8, wherein one or more of the plurality of computing systems are also configured to individually or collectively provide information pertaining to the execution of the NF to the UE.

10. The non-transitory computer-readable medium of claim 8, wherein the blockchain interaction is a read-only information request.

11. The non-transitory computer-readable medium of claim 8, wherein the API sends token information comprising hardware information pertaining to the UE.

12. The non-transitory computer-readable medium of claim 8, wherein
  the API is configured to use the smart contract, and
  the smart contract performs verification via a blockchain system.

13. A computer-implemented method, comprising:
  Initiating a blockchain interaction using an application programming interface (API) to authenticate an authentication request for a network function (NF) of a cellular network from user equipment (UE) via a blockchain network, wherein the blockchain interaction is a transaction, and the transaction is appended as a block to the ledger by the blockchain network, by one or more computing systems of an authenticating data center (ADC), wherein the blockchain network is configured to validate the blockchain interaction using an automated smart contract and a ledger, the smart contract created by a vendor associated with the cellular network and controlling the access of the NF by the UE;
  confirming that the blockchain interaction was verified, by the one or more computing systems of the ADC; and
  executing the NF or causing execution of the NF after the confirmation, by the one or more computing systems of the ADC, wherein the NF performs one or more of providing location data, providing a policy, performing network slicing, performing smart routing, obtaining traffic pattern insights across the network, providing access to cloud native distributed infrastructure, performing session management, providing distributed computing, and providing mobility management services, and
  provide information pertaining to the execution of the NF to the UE.

14. The computer-implemented method of claim 13, further comprising:
  providing information pertaining to the execution of the NF to the UE, by the one or more computing systems of the ADC.

15. The computer-implemented method of claim 13, wherein the API sends token information comprising hardware information pertaining to the UE.

16. The computer-implemented method of claim 13, further comprising:
  providing a list of NFs to the UE, by the one or more computing systems of the ADC.

* * * * *